1,990,882

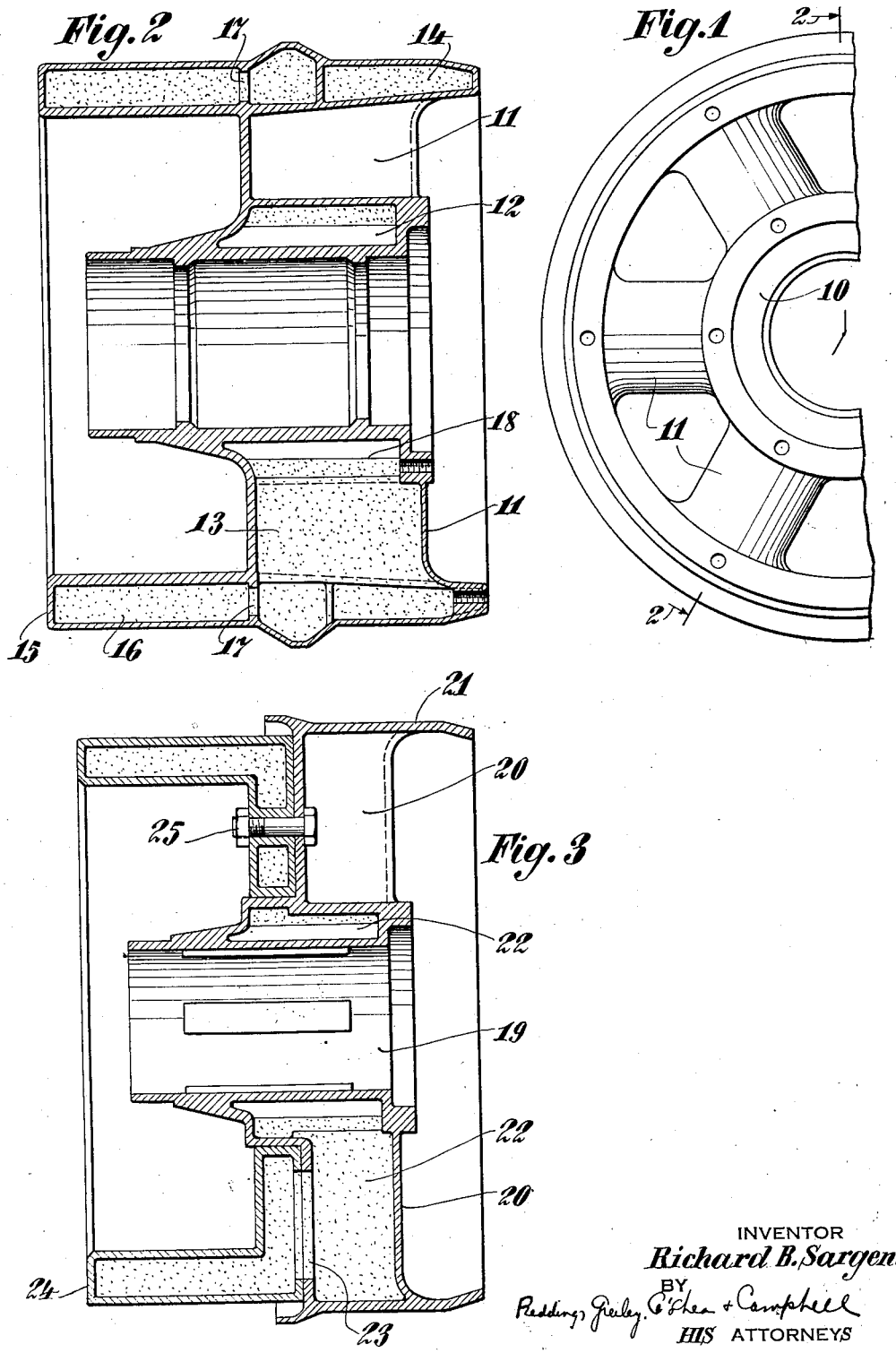
Feb. 12, 1935. R. B. SARGENT 1,990,882
COOLING DEVICE FOR VEHICLE BRAKE DRUMS
Filed Sept. 23, 1932
INVENTOR
Richard B. Sargent,
HIS ATTORNEYS Patented Feb. 12, 1935

UNITED STATES PATENT OFFICE 1,990,882

COOLING DEVICE FOR VEHICLE BRAKE DRUMS

Richard B. Sargent, Emaus, Pa., assignor to International Motor Company, New York, N. Y., a corporation of Delaware Application September 23, 1932, Serial No. 634,479

2 Claims. (Cl. 188—264)

The present invention relates to brake mechanisms for motor vehicles and embodies, more specifically, an improved brake construction, wherein a heat absorbing material is provided to control the absorption and dissipation of heat in the brake structure.

Under present conditions in motor vehicle operation, an enormous amount of work is imposed upon the brake structures thereof and extremely rapid heat rises within such structures take place. In order that the wearing elements of the brake structure may not be injured, it is necessary to supply a sufficient quantity of metal to accommodate the heat rises encountered without causing injury to the parts. Inasmuch as the specific heat of steel is about .12, the resulting brake structure is quite heavy and adds considerable weight to the vehicle.

In order that a brake structure of comparatively light nature may be provided to afford the desired braking characteristics without imparting unnecessary weight to the vehicle beyond that required to accommodate the mechanical strains arising, the present invention has been designed and an object thereof is to provide a brake construction wherein one or more of the parts subjected to rapid rises in temperature is provided with a means for absorbing sufficient quantities of heat to prevent injury of the brake structure.

A further object of the invention is to provide a brake structure wherein means has been incorporated to absorb heat rapidly in order that the brake structure may not become overheated during sudden temperature rises, such means including a substance whose specific heat is considerably more than that of the brake structure.

A further object of the invention is to provide a brake structure wherein a heat absorbing material is utilized in such fashion that rapid rises in temperature of the braking structure are prevented, the heat absorbing element absorbing sufficient heat tending to cause rapid rises in temperature to prevent injury to the braking structure and subsequently dissipating such heat to the atmosphere by convection.

Further objects, not specifically enumerated above, will be apparent as the invention is described in greater detail in connection with the accompanying drawing, wherein:

Figure 1 is a segmental view in front elevation showing a vehicle wheel and brake drum constructed in accordance with the present invention.

Figure 2 is a view in section, taken on line 2—2 of Figure 1, and looking in the direction of the arrows.

Figure 3 is a view similar to Figure 2, showing a modified form of the invention before describing the construction illustrated in the above figures of the drawing.

It is to be noted that the invention contemplates the use of a heat absorbing material which may be used under all conditions of operation regardless of atmospheric conditions, the material being of such nature that, between the temperature ranges encountered in practice, no deleterious results are produced. In this connection, it has been found that salt serves very well as the heat absorbing material, the salt passing into a liquid state within the temperature range encountered in practice. A salt which is suitable for use in this connection is sodium nitrate. Not only does the salt store up heat by reason of its temperature rise but an enormous amount of latent heat is absorbed due to the change of state from a solid to a liquid form. No dangerous pressures are encountered between the temperature ranges found in normal practice and, inasmuch as salt is much lighter than steel and has a specific heat considerably more than steel, the weight of the brake structure may be materially reduced without jeopardizing the same by reason of high temperatures which are generated during operation.

After the salt has absorbed the heat generated during a braking operation, the brake structure cools off and heat is then dissipated from the structure and the salt, the salt solidifying and giving up its latent heat which was absorbed during the braking operation.

One construction embodying this invention is illustrated in Figures 1 and 2, wherein a vehicle wheel is indicated as having a hub 10 and spokes 11. The hub may be formed with a passage 12 which may communicate with passages 13 within the spokes and an outer passage 14 within the rim of the wheel. A brake drum 15 is suitably secured to the wheel and is formed with an annular passage 16 which may communicate through ports 17 with passage 14. Within the passages described above, a substance, such as salt, is inserted, this substance being indicated at 18. If the temperatures arising during braking are sufficiently high the salt changes from a solid to a liquid absorbing an enormous amount of heat which is in latent form. When the braking operation is discontinued, the heat absorbed by the salt is dissipated gradually and a normal temperature attained.

In the construction shown in Figure 3, a wheel is illustrated as formed with a hub 19 having spokes 20 and rim 21. Passages 22 are formed within the hub and spokes and may communicate through apertures 23 with the hollow portion of a brake drum 24. The brake drum may be secured to the spokes 20 by means of bolts 25 and the hollow portions of the drum and spokes are filled with a suitable substance, such as salt. In addition to the absorption of heat by reason of the presence of the salt within the wheel structure, the substance, when in liquid form, may flow to remote portions of the wheel and thus effect the dissipation of heat readily to prevent damage to the brake structure.

In the drawing, the substance within the passages is shown in the position assumed thereby when the wheel is rotating and the substance is thrown toward the periphery of the wheel because of centrifugal force.

While the invention has been described with specific reference to the accompanying drawing, it is not to be limited, save as defined in the appended claims.

I claim as my invention:

1. In combination with a vehicle wheel and an annular braking element thereon, said wheel and element being formed with communicating hollow portions, and means in the hollow portions having a greater specific heat than the substance from which the element is made to absorb heat from the element.

2. In combination with a vehicle wheel and an annular braking element thereon, said wheel and element being formed with communicating hollow portions, and a salt in the hollow portions, having a greater specific heat than the substance from which the element is made to absorb heat from the element.

RICHARD B. SARGENT.